Feb. 9, 1965 G. H. DAVIS 3,168,785
DITCHING MACHINE HAVING FLOATINGLY MOUNTED CUTTING HEAD
Filed March 30, 1962 4 Sheets-Sheet 1

INVENTOR.
GEORGE H. DAVIS
BY *Baldwin & Wright*
ATTORNEYS

Feb. 9, 1965 G. H. DAVIS 3,168,785
DITCHING MACHINE HAVING FLOATINGLY MOUNTED CUTTING HEAD
Filed March 30, 1962 4 Sheets-Sheet 2

INVENTOR.
GEORGE H. DAVIS
BY *Baldwin & Wright*
ATTORNEYS

Feb. 9, 1965 G. H. DAVIS 3,168,785
DITCHING MACHINE HAVING FLOATINGLY MOUNTED CUTTING HEAD
Filed March 30, 1962 4 Sheets-Sheet 3

INVENTOR.
GEORGE H. DAVIS
BY
Baldwin & Wight
ATTORNEYS

INVENTOR.
GEORGE H. DAVIS
BY Baldwin & Wight
ATTORNEYS

United States Patent Office 3,168,785
Patented Feb. 9, 1965

3,168,785
DITCHING MACHINE HAVING FLOATINGLY MOUNTED CUTTING HEAD
George H. Davis, 624 W. St. Peter St., New Iberia, La.
Filed Mar. 30, 1962, Ser. No. 183,959
3 Claims. (Cl. 37—92)

This invention relates to ditching machines, and more particularly to machines of this class which include a mobile frame or main structure and a cutting head mounted on and extending downwardly from the frame or main structure to a lower or ditching level and being operable for removing dirt as the machine travels over the ground.

One class of ditching machines in which the invention may be embodied to especial advantage is that characterized by a cutting head equipped with a power driven cutting device, in many cases a cutting wheel mounted to rotate about an axis extending fore-and-aft of the direction of machine travel, and facing forwardly.

An object of the invention is to provide a machine of the character stated including means for mounting the cutting head on the frame in a manner to permit a desirable but not excessive floating movement, preferably both horizontal and vertical.

Another object of the invention is to provide an improved means for towing or pulling a cutting head while the latter is somewhat free to float with respect to the frame, provision preferably being made for selecting and setting the angle of approach or attitude of the cutting head with respect to the ground.

A further object of the invention is to provide an auxiliary wheel mounted to be positioned above the ground when a ditching operation is being performed, but to be movable into contact with the ground for lifting one side of the machine sufficiently to raise one of the drive wheels, which may be a spike wheel, out of contact with the ground.

Other objects of the invention will become apparent from a reading of the following description, the appended claims, and the accompanying drawings, in which:

Figure 1:
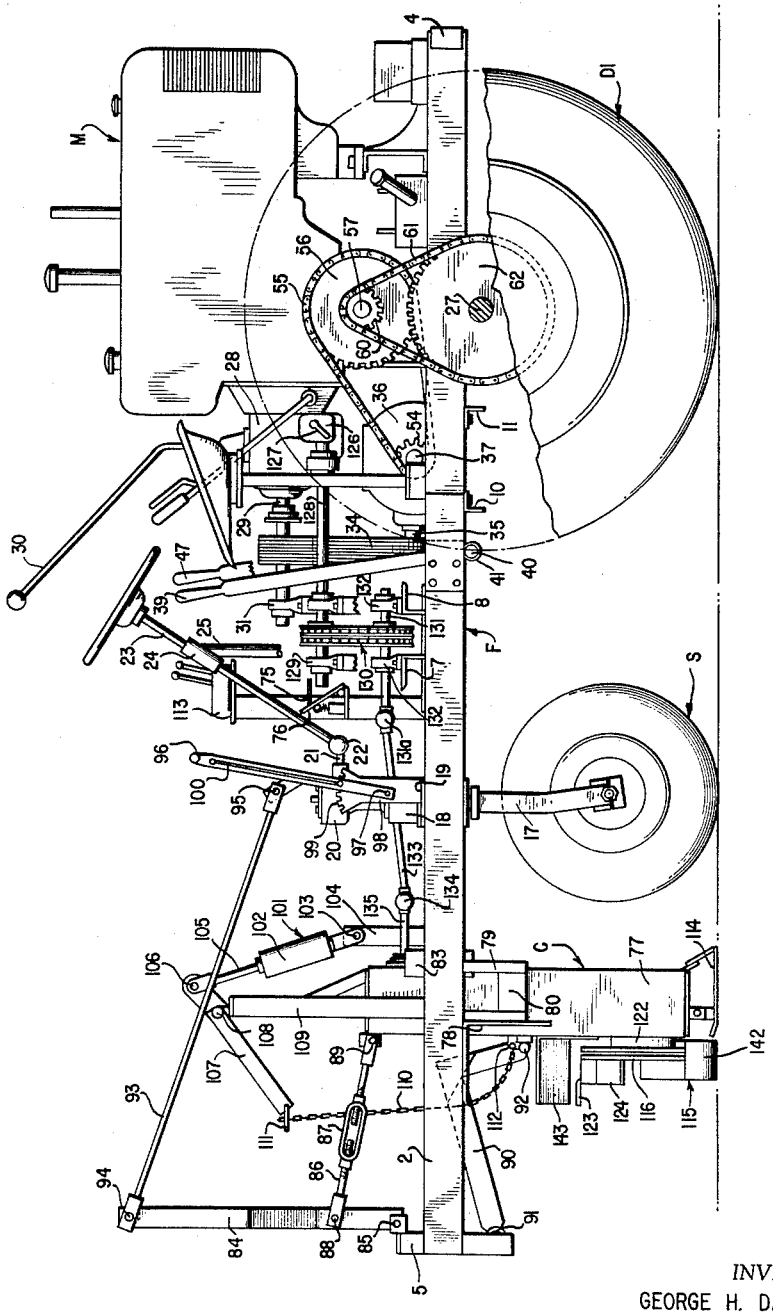
FIGURE 1 is a side elevational view of a ditching machine embodying the invention as viewed from the left side of the driver's position, certain parts including an auxiliary wheel being omitted.

In its general nature, the machine shown in the drawings as embodying the invention in one preferred form includes a main frame F, drivable ground engaging wheels D1 and D2 supporting the frame for movement over the ground, a steerable wheel S, a cutting head generally designated C mounted on the frame F to float both vertically and horizontally, an auxiliary ground engageable wheel A, and an engine or motor M. The drivable wheel D1, the steerable wheel S and the auxiliary wheel A have relatively smooth circumferential ground engaging circumferential surfaces, the wheel D1 however being cleated if desired to provide the required driving traction effort. The wheel D2 is a spike wheel adapted to run in loosely piled or windrowed dirt and to sink into the dirt so as not unduly to tip the machine. The cutting head C is, as previously stated, mounted for floating movements on the frame F and, importantly, is so connected to the frame as to be pulled by the latter during the ditching operation, as distinguished from being pushed.

Considering the general mode of operation, the head C is lowered to a ditching level by operation of mechanism to be described, the auxiliary wheel A is lifted clear of the ground and the steerable wheel S is set in a desired attitude in which it is locked so as to prevent it from castering or changing its attitude. The drivable wheels D1 and D2 are operated by the motor M for advancing the machine toward the left as viewed in FIGURE 1. A cutting device carried by the head C to face in the direction of movement of the machine is also operated by the motor M. Although the motor M provides power both for operating the wheels D1 and D2 and for operating the cutting mechanism carried by the head C, power is transmitted to the wheels D1 and D2 and to the cutting head mechanism over separately controllable drive transmission trains, thus enabling the forward progress of the machine and the operation of the cutting mechanism to be controlled individually and coordinated for obtaining best results, according to the particular operating conditions. For facilitating transporting the machine from one operating locale to another, as for example over hard surfaced roadways, the cutting head C is raised to a non-cutting level, and the auxiliary wheel A is lowered to engage the ground close to the spike wheel D2 and to lift the right side of the machine sufficiently to move the spike wheel D2 upwardly off the ground.

Some of the broader aspects of the invention having been outlined above, a more detailed description of the illustrative embodiment will serve further to explain these broad aspects of the invention and will also explain further features of the invention including, inter alia, new and improved control mechanisms and co-relative arrangements of the control mechanisms with each other and with the more broadly considered components.

The main frame F is shown as being fabricated of structural metal members of various cross sectional shapes, including two longitudinal side members 1 and 2, an intermediate longitudinal member 3, rear and front transverse members 4 and 5 respectively, an inclined member 6, intermediate transverse or cross members 7, 8, 10, 11 and 12, and two further longitudinal members 13 and 14.

Figures 2, 9:
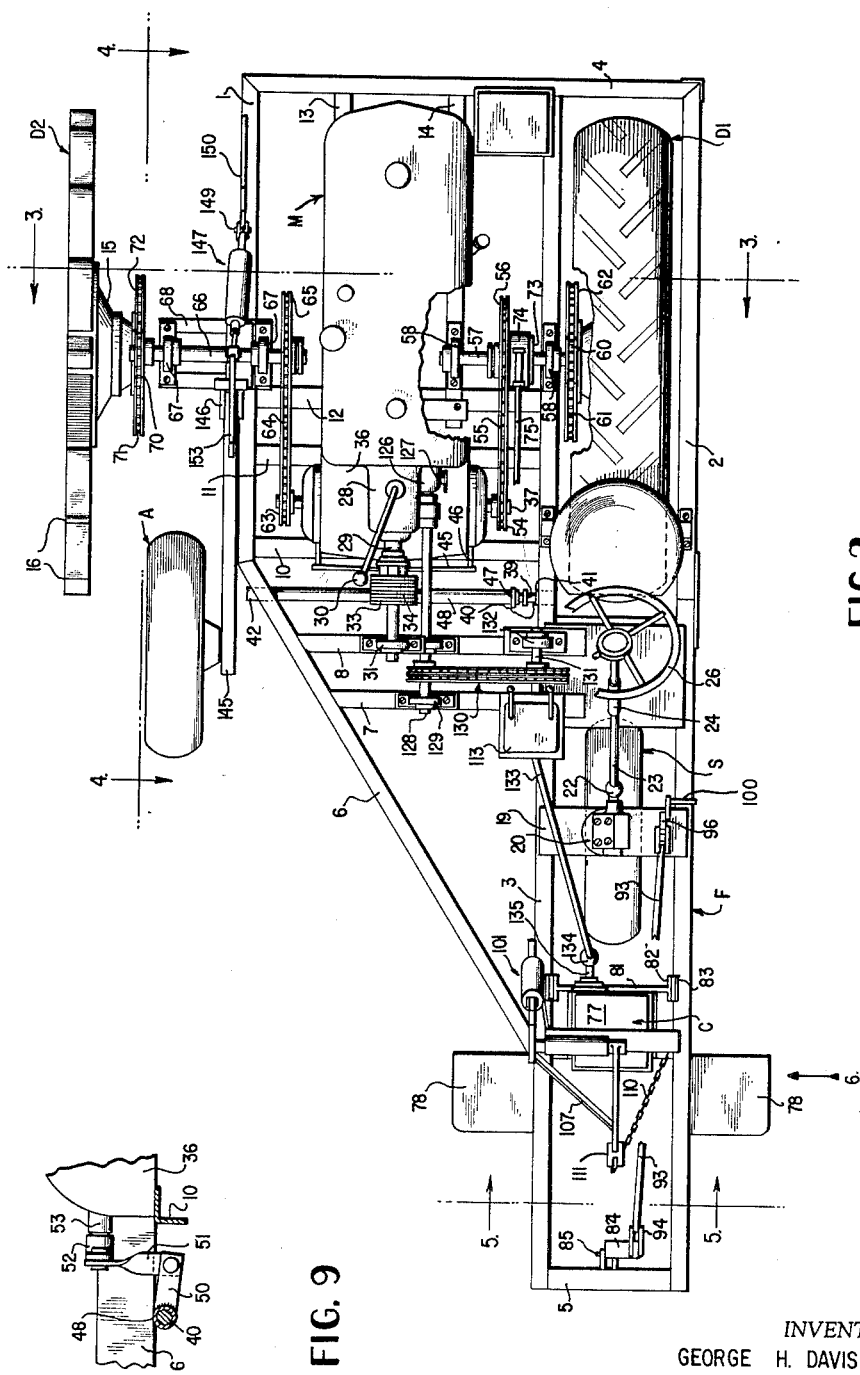
FIGURE 2 is a top plan view of the machine shown in FIGURE 1, with some parts broken away and also showing the auxiliary wheel and its mounting.
FIGURE 9 is a fragmentary section on the line 9—9 of FIGURE 8.
Figures 3, 4:
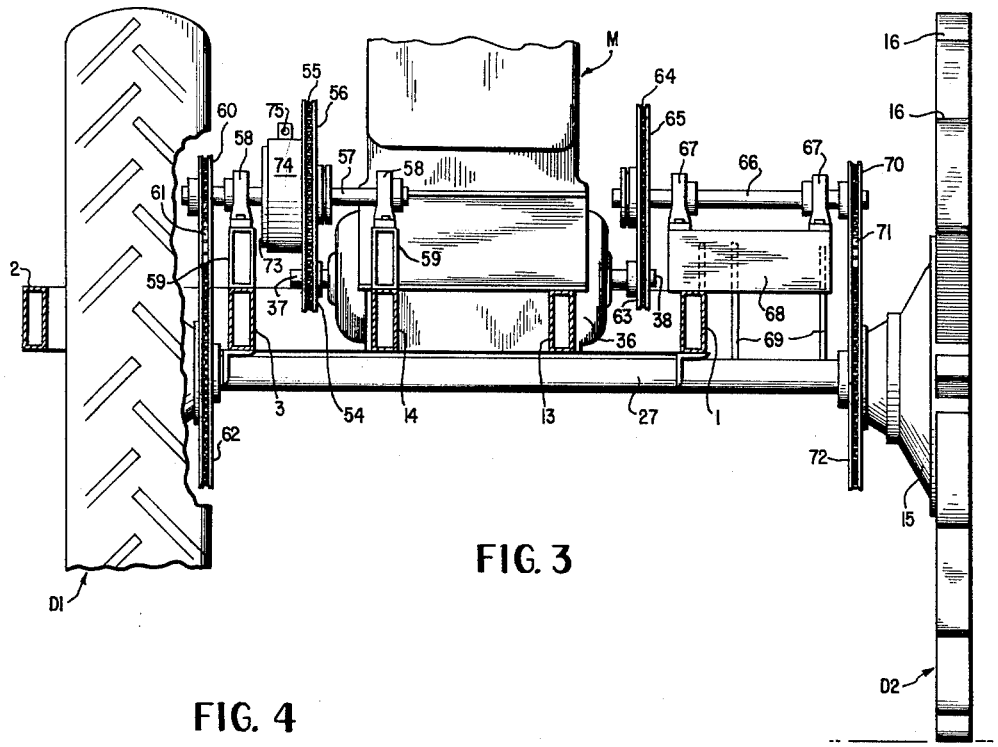
FIGURE 3 is a transverse vertical section on the line 3—3 of FIGURE 2, on an enlarged scale.
FIGURE 4 is a fragmentary side elevation on an enlarged scale, part of a spike wheel being broken away and the spike wheel axle being shown in vertical section on the line 4—4 of FIGURE 2.

As outlined generally above, in normal use, that is when a ditching operation is being performed, the frame F is supported by the drivable wheels D1 and D2, and the steerable wheel S, the auxiliary wheel A then being raised to its inoperative position as shown in FIGURES 2 and 4. The wheels D1 and D2, being positioned under the motor M, carry the larger portion of the machine weight and are thus able to provide sufficient traction for driving the machine over the ground while remaining substantially level in a side-to-side sense by virtue of the spike construction of the wheel D2. The wheel S is positioned substantially directly behind the cutting head C so as to run along the bottom of a ditch cut by the cutting mechanism and partly to support the front end portions of the machine.

Steering of the machine is effected by transmitting drive differentially to the drivable wheels D1 and D2, the wheel S being so mounted that it may be locked in a predetermined attitude and thus prevented from castering while a ditch is being cut. This enables the steering to be effected substantially solely by differentially driving the wheels D1 and D2, thus simplifying the steering duties of the operator. When the machine is steered from one side to the other, the wheel S, then being locked in a fixed attitude, is dragged or slid across the bottom of the ditch, the resistance to sliding or dragging serving to stabilize the steering function or, otherwise stated, to prevent "hunting." The wheel D2, being of spike formation and comprising a hub 15 and radial spikes 16, may sink down into a windrow of loose dirt thrown out from the ditch by the cutting mechanism C, but nevertheless will provide the necessary driving traction on the right side of the machine.

The steerable wheel S is journalled on a fork 17 the upper end of which is mounted to turn in a vertical bearing 18 carried by a plate 19 supported by the main frame F. Steering of the wheel S, as for example when the machine is travelling over a roadway, or for changing the attitude of the wheel S in preparation for cutting a ditch, is effected through an irreversible steering gear housed in a casing 20 above the bearing 18 and which may include, for example, a worm gear (not shown) secured to the spindle at the top of the fork 17 and a worm (not shown) journalled in the casing 20. A worm shaft 21 is operable through a universal joint 22, a steering shaft 23 journalled in a bearing 24 carried by a post 25 on the frame F and a steering operating member or wheel 26.

The wheels D1 and D2 are journalled to rotate freely on opposite ends of an axle 27 (FIGURES 1 and 3) secured to the frame F, each wheel being drivable separately and the two wheels being drivable differentially for steering by the motor M.

The motor is equipped with a variable speed transmission 28, which may be of known or conventional form, having an output shaft element 29 and a control lever 30 for selecting the drive speed ratio from the main motor shaft to the output shaft 29. The outer end of the shaft 29 is supported for rotation by a bearing 31 carried by the transverse frame member 8.

Driving effort is transmitted from the output shaft 29 through a multiple groove pulley assembly or structure 33 and a plurality of V belts 34 to the input shaft element 35 (FIGURE 1) of a double clutch mechanism unit 36 which also may be of known or conventional construction. The double clutch unit 36 has two output shaft elements 37 and 38 (FIGURES 1, 2 and 3) projecting towards opposite sides of the frame F, and includes two clutch mechanisms which are separately and differentially controllable for transmitting drive from the input shaft 35 to the shafts 37 and 38. The details of the double clutch unit 36, forming no part per se of the present invention, are not illustrated. Any of a number of known suitable double clutch units having an input shaft, two output shafts, and two selectively operable clutches interposed between the input shaft and the respective output shafts will serve the purpose. One such known double clutch mechanism unit is disclosed in the United States patent to Johnson, No. 1,338,777 dated May 4, 1920.

Figure 8:
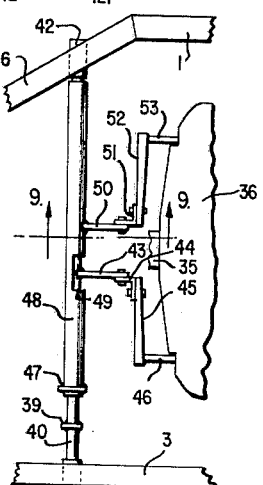
FIGURE 8 is a top plan view showing a portion of a double clutch differential drive transmitting mechanism and associated control linkage.

Separately operable linkage mechanisms are provided for controlling the clutches associated with the shafts 37 and 38. The mechanism for controlling the clutch associated with the shaft 37 includes a lever 39 fixed to a rock shaft 40 mounted in bearings 41 and 42 secured respectively to the frame members 3 and 6. An arm 43 fast on the shaft 40 is connected by a link 44 to an arm 45 secured to a clutch operating spindle 46 extending outwardly from the housing of the clutch unit 36 as shown in FIGURE 8. Engagement and disengagement of the clutch through which drive is transmitted to the shaft 37 is effected by rocking of the lever 39 with consequential rocking of the clutch controlling spindle 46.

Controlling of the clutch through which drive is transmitted to the output shaft 38 is effected through a linkage comprising a lever 47 fixed to a sleeve 48 mounted to rock on the shaft 40 and having a cut out portion 49 through which the arm 43 previously referred to extends with clearance for enabling the shaft 40 and sleeve 48 to be rockable, each independently of the other. Fixed to the sleeve 48 is an arm 50 which is connected by a link 51 to an arm 52 secured to a spindle 53 which is rockable for engaging and disengaging the clutch through which drive is transmitted to the output shaft 38. The clutch control spindle 53 is, of course, operated similarly to the operation of its companion spindle 46 by the movement of the control lever 47 instead of the control lever 39.

Mechanism for transmitting drive from the double clutch unit output shaft 37 to the wheel D1 includes a sprocket 54 fixed to the shaft 37, a chain 55 trained around the sprocket 54 and also trained around a sprocket 56 fast with a jack shaft 57 journalled to rotate in bearings 58, 58 mounted on blocks 59, 59, supported respectively on the longitudinal frame members 3 and 14. A sprocket 60 secured to the jack shaft 57 transmits drive through a chain 61 to a sprocket 62 secured to the hub of the wheel D1.

Similar mechanism is provided for transmitting drive from the double clutch unit output shaft 38 to the spike wheel D2. In this case, a sprocket 63 secured to the shaft 38 is embraced by a chain 64 which is trained around a sprocket 65 fast with a jack shaft 66 journalled to rotate in bearings 67, 67 mounted on a base 68 carried by the frame member 1 and a pair of supplemental supports 69, 69. Drive is transmitted from the jack shaft 66 through a sprocket 70 fast with the shaft 66 and a chain 71 to a sprocket 72 fast with the hub 15 of the wheel D2.

In operation, manipulation of the steering control levers 39 and 47 with consequential differential engaging and disengaging of the two clutches included in the double clutch unit 36 will transmit drive differentially to the wheels D1 and D2 so as to provide both the driving of the machine in the direction of ditching and steering the machine. Steering is to be considered as including both maintaining the machine on a straight course when a straight ditch is to be cut and also changing the direction of advance when the ditch is to be curved.

The machine may also be provided with an auxiliary brake mechanism including, for example, a brake drum 73 fast with the sprocket 56 included in the drive train to the wheel D1, a cooperating brake band 74, and a brake operating rod 75 extending from the band 74 to a brake pedal 76 shown in FIGURE 1.

Figure 5:
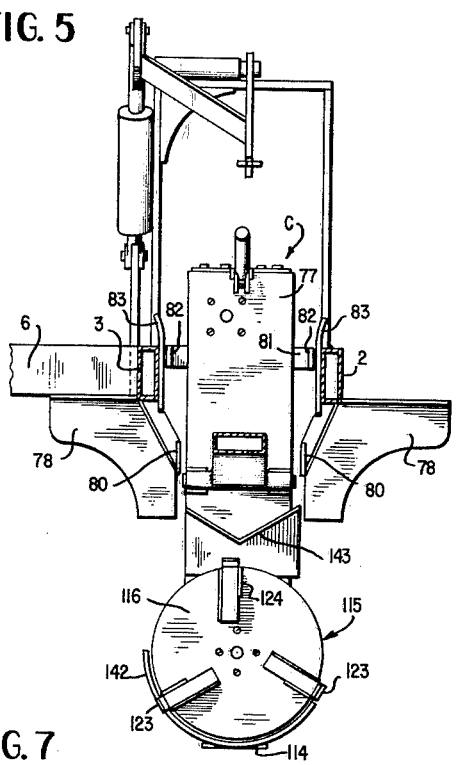
FIGURE 5 is a transverse vertical section on the line 5—5 of FIGURE 2, on an enlarged scale.

The cutting head C is mounted on the frame F ahead of the wheels D1, D2 and S and behind the front end of the frame in a manner to float both vertically and horizontally during a ditching operation. The cutting head comprises a housing or casing 77 the lateral floating movement of which is limited by a vertically extending guide structure comprising side guide brackets 78, 78 secured to the frame members 2 and 3 as shown in FIGURE 5, supporting plates 79, 79 also secured to the frame F, and fore-and-aft extending guide plates 80, 80 carried by the brackets 78, 78 and the arms 79, 79. Considerable clearance is provided between the sides of the cutting head housing 77 and the guide plates 80, 80 to permit substantial lateral floating movement of the cutting head but to limit this movement within a desired range so as to prevent excessive lateral movement. Secured to the cutting head casing 77 near its upper end is a cross bar 81 formed with end flanges 82, 82 which fit with considerable lateral clearance between additional frame mounted guides 83, 83. The cross bar end flanges 82, 82 cooperate with the upper guides 83, 83 to supplement the guiding action provided by the lower guides 80, 80 in maintaining the cutting head against excessive lateral movement.

Figure 7:
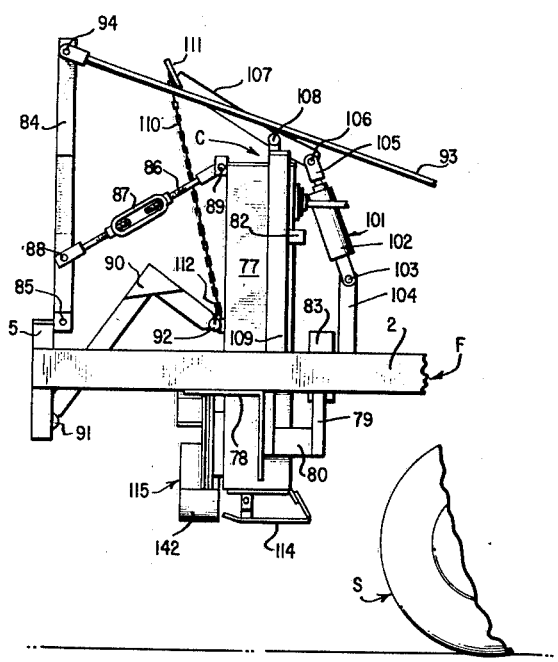
FIGURE 7 is a fragmentary side elevation, again as viewed in the direction of the arrow 6 in FIGURE 2, of the cutting head, shown in raised position and a linkage connecting the cutting head to the machine frame.

When a ditching operation is being performed, the cutting head C is pulled or towed by connections in front of the head between the latter and the forward part of the frame, illustrated as comprising a four bar linkage assembled substantially as a parallelogram. Referring particularly to FIGURES 1 and 7, a control lever member 84 is pivoted at 85 on the front frame cross member 5 to rock about a transverse axis. Normally, the control lever 84 is held in fixed position on the frame so as, in effect, to constitute a fixed part of the frame and to serve as part of one link of the four bar linkage. The linkage further includes an upper link 86 having a turnbuckle 87 by which the length of the link may be adjusted. The link 86 is pivoted at 88 to the control lever 84, and is pivoted at 89 to the upper end portion of the cutting head casing 77. A lower link 90, which is shown as being of angle form, is pivoted at 91 to the frame front cross structure 5 and is pivoted at 92 to the cutting head casing 77 at a point spaced below the pivoted connection 89 between the link 86 and the casing. The arrangement is such that when the control lever 84 is fixed in a set position, the lever 84 and front frame cross member 5 constitute a portion of the frame which serves as the fixed link of the four bar linkage, the cutting head casing 77 serving as the movable link opposite the fixed link.

For normally maintaining the control lever 84 fixed in a set position, and also for enabling rocking adjustment thereof when desired, a rod 93 is pivoted at 94 to the upper end of the control lever 84 and is pivoted at 95 to a manually operable lever 96, itself pivoted at 97 on a standard 98 carried by the frame F. The upper end of the standard 98 is formed with a toothed segment 99 cooperable with locking mechanism 100 on the lever 96 for maintaining the latter in a selected position of adjustment.

When the machine is being transported, for example over a roadway, and no ditching operation is to be performed, the cutting head C is raised to a position in which its lower end is disposed well above the wheel S, as shown in FIGURE 7. For this purpose, there is provided a hydraulic motor 101 the cylinder 102 of which is pivoted at 103 to a post 104 carried fixed to the frame F. The piston rod 105 of the motor 101 is pivoted at 106 to one end of a lifting lever 107 pivoted at 108 on a post 109 fixed to and extending upwardly from the frame F. A flexible chain member or connection 110 is connected at 111 to the other end of the lever 107 and is connected at 112 to the cutting head casing 77. The hydraulic motor 101 is operated by fluid pressure under the control of a valve assembly generally designated 113 in FIGURES 1 and 2. The fluid pressure lines between the valve assembly 113, the hydraulic motor 101 and a suitable source of fluid pressure may be of any suitable or conventional form or arrangement and are not illustrated.

When a ditch is to be cut, the control valve equipment 113 is operated to cause the piston rod 105 to be extended and thus to rock the lever 107 counterclockwise as viewed in FIGURE 7 and lower the chain 110 so that the weight of the cutting head C will bring the latter downwardly to a cutting level. Once the cutting of a ditch has been started, the chain 110 will be very slack and the weight of the cutting head will be supported mainly by a skid shoe 114 secured to the lower end of the cutting head casing 77. With the attitude of the cutting head, that is its vertical or somewhat front-to-rear off-vertical position with respect to the ground, having been set properly, pulling of the cutting head forwardly by the links 86 and 90, then subjected to tension, and resting of the skid shoe 114 on the bottom of the ditch will maintain the cutting head at a substantially constant cutting level.

The cutting device, previously referred to only generally, comprises a cutting wheel 115 mounted at the lower end and in front of the cutting head casing 77 to rotate about an axis extending fore-and-aft of the machine.

Figure 6:
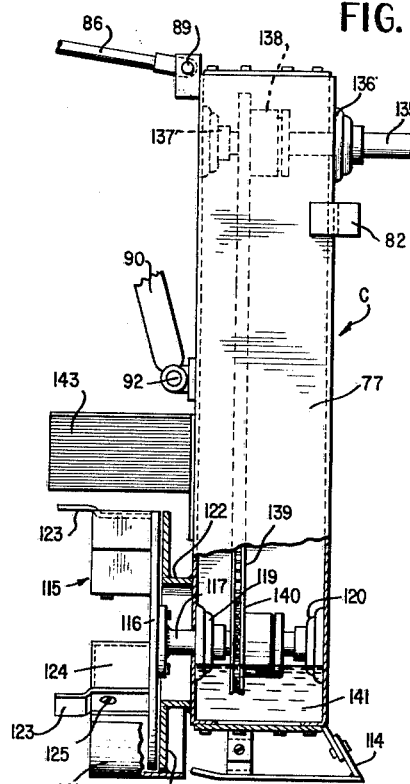
FIGURE 6 is an enlarged scale fragmentary side elevation of a cutting head as viewed in the direction of the arrow 6 in FIGURE 2, some parts being shown in section.

As shown in FIGURES 5 and 6, the cutting wheel 115 comprises a disk 116 secured to the forward end of a shaft 117 mounted to rotate in sealed bearings 119 and 120 secured to the front and rear walls of the cutting head casing 77. A back-up disk 121 is mounted immediately behind the disk 116 with only operating clearance between the two disks, and is carried by a sleeve 122 welded or otherwise secured to the front wall of the cutting head housing 77. The back-up disk 121 prevents rocks and the like from striking the shaft 117 and minimizes dirt entering the sealed bearing 119.

The cutting wheel disk 116 is provided with three forwardly projecting cutting knives 123 secured to knife mountings 124 fixed to and projecting forwardly from the disk 116. Screws 125 may be employed for detachably mounting the knives 123.

The cutting wheel 115 is driven by the motor M through a power take-off unit 126, shown in FIGURES 1 and 2 as being positioned to receive drive from the motor ahead of the variable speed transmission 28 so as to transmit drive to the cutting wheel independently of the transmission of drive to the wheels D1 and D2. The power take-off mechanism 126 is controllable by a lever 127 for driving a shaft 128 journalled in frame mounted bearings 129, 129. The shaft 128 transmits drive through a sprocket and chain mechanism 130 to a shaft 131 journalled in bearings 132 mounted on the frame cross members 7 and 8. The sprocket and chain drive mechanism 130 may be enclosed in a casing, not shown, containing oil so that the sprockets and chains will be kept bathed in lubricant. The shaft 131 transmits drive through a universal coupling 131a, a further shaft 133 and another universal joint 134 to a shaft 135 journalled in a sealed bearing 136 carried by the rear wall of the cutting head casing 77 and a bearing 137 mounted on the inside of the front wall of the casing 77. The universal couplings 131a and 134, with suitable spline connections to the associated shafts, enable the cutting head C to be raised and lowered and to float both vertically and horizontally as required by operating conditions.

The shaft 135 is provided, within the casing 77, with a sprocket 138 connected by a chain 139 to a sprocket 140 fixed to the cutting wheel shaft 117. Oil, indicated at 141, is provided within the casing 77 to a level covering the lower part of the sprocket 140 so that the driving mechanism housed within the casing 77 will be kept bathed with lubricant.

In operation, when cutting a ditch, the power take-off control lever 127 is set to effect driving of the cutting wheel 115 concurrently with but independently of the driving of the wheels D1 and D2 through the variable speed transmission 28 and the double clutch unit 36. Thus, the rotative speed of the cutting wheel 115 in relation to the rate of forward travel of the machine may be varied according to cutting conditions. The speed of the cutting wheel 115 will normally be constant, although under unusual circumstances the speed could be controlled by varying the motor speed. The relation of the cutting wheel speed to the rate of forward travel is varied by controlling the transmission of drive to the driving wheels D1 and D2 while the cutting wheel continues to rotate at a substantially constant speed.

Preferably, the cutting head is also equipped with a scraper plate 142 carried by the back-up disk 121 and extending arcuately beneath the cutting wheel 115 as best shown in FIGURES 5 and 6. The scraper plate 142 assists in preventing rocks and debris from entering the sleeve 122 around the shaft 117 and also serves to direct dirt to flow upwardly and out of the ditch according to a desired pattern. The skid shoe 114 is mounted behind and at approximately the same level as the scraper plate 142. Positioned above the cutting wheel 115 and carried by the cutting head casing 77 is a V-shaped dirt shield 143 which also causes extracted dirt to flow laterally of the ditch. As viewed from the front of the machine, that is, as in FIGURE 5, the right hand end of the scraper plate 142 is lower than the scraper plate left hand end. This arrangement enables loosened or cut-out dirt to move out freely with rotation of the cutting wheel 115. More dirt will be thrown to the left of the machine as viewed in FIGURE 5 than to the right, the dirt thus being delivered in a sort of windrow in the path of the spike wheel D2.

In preparing the machine for cutting a ditch, the turnbuckle 87 in the link 86 is adjusted to select and fix an appropriate distance between the pivots 88 and 89, and the manually operable lever 96 is set in a selected position so as to set the fore-and-aft position of the pivot 88 and thus adjust the four bar linkage to position the cutting head C in a cutting attitude suited for the particular cutting conditions. This may be done while the cutting head C is in the raised position shown in FIGURE 7. When the cutting of the ditch is to be started, the hydraulic motor 101 is operated to lower the head C as the machine moves forwardly. When the head reaches the desired cutting level, determined by the previous setting of the lever 96 and the turnbuckle 87, the hydraulic motor may be operated to slacken the chain 110 after which the skid shoe 114 will maintain the cutting head at the proper ditching level. When the cutting of a ditch is to be ended by tapering the depth from the bottom of the ditch gradually upwardly to the ground lever, the lever 96 will be operated during forward travel of the machine to change the attitude of the cutting head and enable it to move upwardly. The hydraulic motor 101 and associated mechanism including the chain 110, are used only for raising the cutting head C to a completely inoperative position to enable transporting the machine without ditching.

When the machine is to be transported without ditching, the auxiliary wheel A is lowered to engage the ground and raise the spike wheel D2 off the ground as previously explained generally. As shown in FIGURES 2 and 4, the auxiliary wheel A is journalled at 144 on a lifting arm 145 which is pivoted at 146 on the main frame member 1. A hydraulic motor generally designated 147 has its cylinder 148 pivoted at 149 on a bracket 150 extending upwardly from the frame member 1. The hydraulic motor piston rod 151 is pivoted at 152 to an extension 153 fast with the arm 145.

Operation of the hydraulic motor 147 is controlled by the valve assembly 113 through a hydraulic circuit having flow lines, not shown. The auxiliary wheel A is shown in FIGURE 4 as being in its raised position which it will occupy during a ditching operation. In order to prepare the machine for being transported when not performing a ditching operation, the control valve equipment 113 is actuated to cause the piston rod 151 of the hydraulic motor 147 to be extended so as to rock the armm 145 in the direction of the arrow in FIGURE 4 and to bring the wheel A into engagement with the ground, as shown in dot-dash lines in FIGURE 4 thus lifting the spike wheel D2 off the ground.

The construction shown and described embodies the invention in a preferred form, but it is intended that the disclosure be illustrative rather than definitive, the invention being defined in the claims.

I claim:

1. In a ditching machine, a frame; means supporting said frame for movement over the ground; a cutting head extending vertically from said frame downwardly to a ditching level and having a cutting device facing in the direction of movement of said machine when a ditch is being cut; and means mounting said cutting head floatingly on said frame and comprising vertically extending guide means on said frame engageable by said cutting head for maintaining said cutting head against excessive movement laterally of said frame but with sufficient clearance between said guide means and said cutting head to permit limited lateral floating of said cutting head relatively to said frame, and means connected to said cutting head and to said frame in front of said cutting head with reference to the direction of ditching movement of said machine and being subjected to tension in operation for pulling said cutting head along with said frame.

2. In a ditching machine, a frame; two drivable wheels journalled on said frame respectively on opposite sides thereof, one of said drivable wheels having a relatively smooth circumferential surface and the other of said drivable wheels being a spike wheel comprising a hub and a plurality of radial spikes the outer ends of which are ground engageable; a third wheel journalled on said frame and spaced fore-and-aft thereof from said drivable wheels; an auxiliary wheel having a relatively smooth circumference; means mounting said auxiliary wheel on said frame for movements selectively to a raised position clear of the ground, enabling said drivable wheels and said third wheel to engage the ground, and to a lowered position in which said auxiliary wheel engages the ground on the side of said machine adjacent said spike wheel whereby to lift that side of the machine and said spike wheel to disengage the latter from the ground, the machine then being supported for transport by said drivable wheel having the relatively smooth circumferential surface, said third wheel, and said auxiliary wheel.

3. In a ditching machine, a frame; two drivable wheels journalled on said frame respectively on opposite sides thereof, one of said drivable wheels having a relatively smooth circumferential surface and the other of said drivable wheels being a spike wheel comprising a hub and a plurality of radial spikes the outer ends of which are ground engageable; a third wheel journalled on said frame and spaced fore-and-aft thereof from said drivable wheels; a lifting arm pivotally mounted on said frame at the side thereof on which said spike wheel is journalled; an auxiliary wheel having a relatively smooth circumference journalled on said lifting arm in spaced relation to the pivotal mounting of the latter on said frame; and means for rocking said lifting arm about its pivotal mounting on said frame for moving said auxiliary wheel selectively to a raised position clear of the ground, enabling said drivable wheels and said third wheel to engage the ground, and to a lowered position in which said auxiliary wheel engages the ground on the side of said machine adjacent said spike wheel whereby to lift that side of the machine and said spike wheel to disengage the latter from the ground, the machine then being supported for transport by said drivable wheel having the relatively smooth circumferential surface, said third wheel, and said auxiliary wheel.

References Cited in the file of this patent

UNITED STATES PATENTS

| | | |
|---|---|---|
| 824,740 | Poulson | July 3, 1906 |
| 1,886,691 | Johnson | Nov. 8, 1932 |
| 2,269,502 | Wilson et al. | Jan. 13, 1942 |
| 2,453,723 | Palmer | Nov. 16, 1948 |
| 2,552,710 | Dodson | May 15, 1951 |
| 2,615,263 | Barras | Oct. 28, 1952 |
| 2,623,342 | Fruh | Dec. 3, 1952 |
| 2,674,170 | Morkoski | Apr. 6, 1954 |
| 2,737,734 | Barras | Mar. 13, 1956 |
| 2,770,180 | Dressel | Nov. 13, 1956 |
| 2,925,871 | Gillette | Feb. 23, 1960 |
| 2,976,664 | Monroe | Mar. 28, 1961 |
| 2,984,023 | Dugas | May 16, 1961 |
| 3,021,621 | Needham | Feb. 20, 1962 |

FOREIGN PATENTS

| | | |
|---|---|---|
| 645,519 | Great Britain | Nov. 1, 1950 |
| 216,979 | Australia | Sept. 4, 1958 |
| 1,092,391 | Germany | Nov. 3, 1960 |